US012092969B2

(12) United States Patent
Hara et al.

(10) Patent No.: US 12,092,969 B2
(45) Date of Patent: Sep. 17, 2024

(54) IMAGE-FORMING APPARATUS HAVING CHARGING POTENTIAL CONTROL DURING NON-IMAGE FORMING OPERATION

(71) Applicant: CANON KABUSHIKI KAISHA, Tokyo (JP)

(72) Inventors: Jun Hara, Kanagawa (JP); Taichi Sato, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/185,036

(22) Filed: Mar. 16, 2023

(65) Prior Publication Data

US 2023/0305423 A1 Sep. 28, 2023

(30) Foreign Application Priority Data

Mar. 22, 2022 (JP) ................................ 2022-045083

(51) Int. Cl.
*G03G 15/02* (2006.01)
*G03G 21/00* (2006.01)
*G03G 15/00* (2006.01)

(52) U.S. Cl.
CPC ..... *G03G 15/0266* (2013.01); *G03G 15/0225* (2013.01); *G03G 21/0064* (2013.01); *G03G 15/50* (2013.01)

(58) Field of Classification Search
CPC ........... G03G 15/0266; G03G 15/0225; G03G 15/24; G03G 21/0064; G03G 2215/021
USPC .......................... 399/50, 100, 149, 150, 176
See application file for complete search history.

(56) References Cited

U.S. PATENT DOCUMENTS 5,541,717 A * 7/1996 Saito .................. G03G 15/0225 399/150
5,839,026 A * 11/1998 Ko ..................... G03G 21/0064 399/174
5,970,302 A * 10/1999 Yamane ............ G03G 15/0225 399/50

(Continued)

FOREIGN PATENT DOCUMENTS

JP H08152770 A 6/1996
JP 2003228226 A 8/2003

(Continued)

*Primary Examiner* — Robert B Beatty
(74) *Attorney, Agent, or Firm* — Canon U.S.A., Inc. I.P. Division

(57) ABSTRACT

An image-forming apparatus, wherein, in a non-image-forming operation, a control unit executes the following control processing: i) not discharging electric charge between the charging member and the image bearing member and applying a first voltage having a first polarity with respect to a potential on the image bearing member to the charging member; ii) after performing the processing of i), applying a second voltage having a polarity opposite to the first polarity with respect to the potential; and iii) after performing the processing of ii), controlling a third voltage having a second polarity with respect to the potential to be applied to the charging member and controlling a fourth voltage having a polarity opposite to the second polarity with respect to the potential to be applied to the charging member, and controlling electric charge to be discharged between the charging member and the image bearing member.

11 Claims, 9 Drawing Sheets

(56) References Cited

U.S. PATENT DOCUMENTS

| | | | | |
|---|---|---|---|---|
| 6,032,005 | A * | 2/2000 | Kyung | G03G 15/0225 399/176 |
| 2001/0026694 | A1 * | 10/2001 | Sakaizawa | G03G 15/0225 399/150 |
| 2005/0078981 | A1 * | 4/2005 | Ishiyama | G03G 15/0225 399/129 |
| 2010/0260511 | A1 * | 10/2010 | Kojima | G03G 21/0058 399/46 |
| 2014/0356010 | A1 | 12/2014 | Furukawa | |
| 2016/0216681 | A1 * | 7/2016 | Kato | G03G 15/0225 |
| 2017/0090330 | A1 * | 3/2017 | Kitamura | G03G 15/0266 |
| 2018/0157188 | A1 * | 6/2018 | Ikeda | G03G 15/0225 |

FOREIGN PATENT DOCUMENTS

| | | | |
|---|---|---|---|
| JP | 2007011084 | A | 1/2007 |
| JP | 2010026198 | A | 2/2010 |

* cited by examiner

WHEN -1200 V IS APPLIED

WHEN 0 V IS APPLIED (OFF)

IMAGE-FORMING APPARATUS HAVING CHARGING POTENTIAL CONTROL DURING NON-IMAGE FORMING OPERATION

BACKGROUND OF THE INVENTION

Field of the Invention

The present invention relates to image-forming apparatuses, such as a laser printer, a copying machine, and a facsimile, that print a recorded image by transferring a toner image formed on an image bearing member onto a recording material using an electrophotographic method or the like.

Description of the Related Art

An electrophotographic method is known as an image recording method used for image-forming apparatuses such as a printer and a copying machine. The electrophotographic method is a method using an electrophotographic process as described below. That is, an electrostatic latent image is formed by a laser beam on the surface of a photosensitive drum (hereinafter referred to as a drum) that is charged by a charging member, and a charged coloring material (hereinafter referred to as toner) is developed on the electrostatic latent image to thereby form a developer image. Then, the developer image is transferred onto a recording material and fixed thereon, thereby performing an image-forming operation. A cleanerless method has recently been proposed to achieve size reduction of an image-forming apparatus. The cleanerless method is a method in which a developing unit cleans remaining toner, or developer, off the surface of a drum after a transfer step while developing to remove and collect the remaining toner from the surface of the drum and reuse the collected toner. Since the cleanerless method does not employ a cleaner to clean the surface of the drum, in particular, toner remaining on the surface of the drum after the transfer step can contaminate members in an image-forming apparatus. If the remaining toner contaminates the surface of the charging member, the amount of discharge between the charging member and the drum changes, and a potential formed on the surface of the drum also changes. The amount of contamination on the surface of the charging member varies depending on the shape of the charging member, contact pressure, surface roughness, or the like, and the degree of contamination varies depending on the position on the surface of the charging member in many cases. Accordingly, an image with a density variation is generated with the periodicity of the charging member. As a countermeasure against this, Japanese Patent Application Laid-Open Publication No. 2010-26198 discusses a configuration for transferring toner adhering to a charging roller onto the surface of a drum by varying a voltage to be applied to a charging member and thus varying a potential difference between the charging member and the drum, and executing a cleaning operation to clean the charging member.

However, the configuration discussed in Japanese Patent Application Laid-Open Publication No. 2010-26198 has the following issue. That is, in the cleaning operation to clean the charging member as discussed in Japanese Patent Application Laid-Open Publication No. 2010-26198, if a charging voltage to be applied to the charging member is higher than or equal to a discharge threshold for the drum, toner adhering to the surface of the charging roller may be charged to a polarity opposite to the charging voltage. As a result, an adhesion force between the charging roller and the toner increases, which may make it difficult to transfer the toner onto the surface of the drum from the charging roller.

SUMMARY OF THE INVENTION

The present invention is directed to providing an image-forming apparatus capable of preventing generation of a defective image due to a charging roller.

According to an aspect of the present invention, an image-forming apparatus configured to execute an image-forming operation to form an image on a recording material, the image-forming apparatus includes an image bearing member, a driving portion configured to rotationally drive the image bearing member, a charging member to be in contact with a surface of the image bearing member to form a charging portion, the charging member being configured to charge the surface of the image bearing member at the charging portion, a developing member configured to supply the surface of the image bearing member with developer, a charging voltage application portion configured to apply a charging voltage to the charging member, and a control unit configured to control the driving portion and the charging voltage application portion, wherein the control unit controls the image-forming operation and a non-image-forming operation different from the image-forming operation to be executable, the non-image-forming operation being an operation to apply the charging voltage to the charging member in a state where the image bearing member is rotated, and wherein, in the non-image-forming operation, the control unit executes the following control processing:

i) not discharging electric charge between the charging member and the image bearing member and applying a first charging voltage having a first polarity with respect to a surface potential on the surface of the image bearing member to the charging member;

ii) after performing the processing of i), not discharging electric charge between the charging member and the image bearing member and applying a second charging voltage to the charging member, the second charging voltage having a polarity opposite to the first polarity with respect to the surface potential; and iii) after performing the processing of ii), controlling a third charging voltage having a second polarity with respect to the surface potential to be applied to the charging member and controlling a fourth charging voltage having a polarity opposite to the second polarity with respect to the surface potential to be applied to the charging member, and controlling electric charge to be discharged between the charging member and the image bearing member in a case where at least one of the third charging voltage and the fourth charging voltage is applied as the charging voltage.

Further features of the present invention will become apparent from the following description of embodiments with reference to the attached drawings.

DESCRIPTION OF THE EMBODIMENTS

Modes for carrying out the present invention will be illustratively described in detail below with reference to the drawings based on embodiments. The dimensions, materials, shapes, relative arrangements, and the like of components described in the following embodiments can be changed, as needed, depending on the configuration of the apparatus to which the invention is applied and various conditions. That is, the scope of the invention is not limited to the following embodiments.

1. Image-Forming Apparatus

Figure 1:
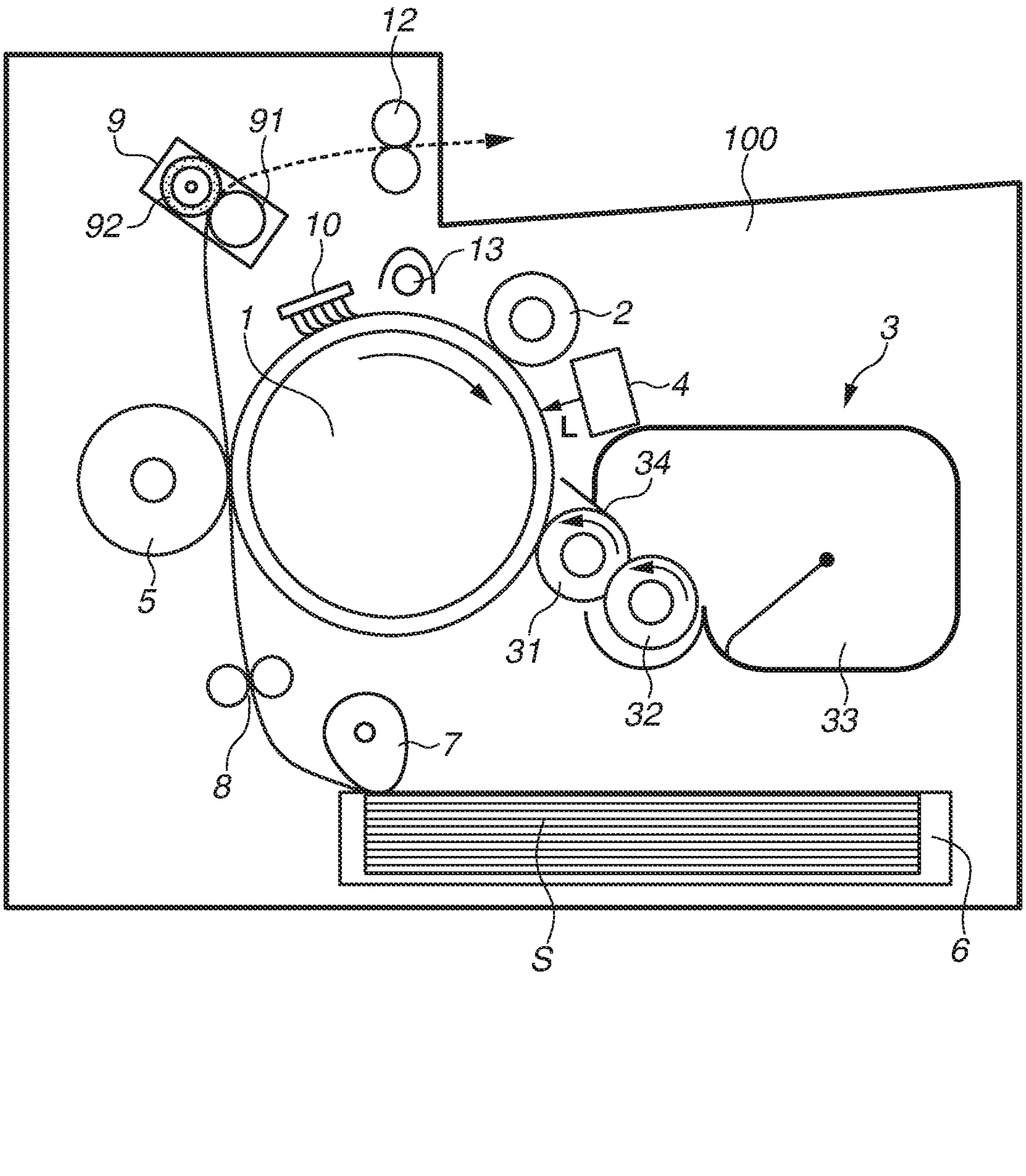
FIG. 1 is a schematic view illustrating an image-forming apparatus according to a first embodiment.

FIG. 1 illustrates a schematic configuration of an image-forming apparatus 100 according to a first embodiment of the present invention.

The image-forming apparatus 100 according to the present embodiment is a monochrome laser printer that employs a cleanerless method and a contact charging method.

The image-forming apparatus 100 according to the present embodiment is provided with a cylindrical photosensitive member, or a photosensitive drum 1, as an image bearing member. A charging roller 2 serving as a charging unit and a developing device 3 serving as a developing unit are provided near the photosensitive drum 1. An exposure device 4 serving as an exposure unit is provided between the charging roller 2 and the developing device 3 in a rotational direction of the photosensitive drum 1 illustrated in FIG. 1. A transfer roller 5 serving as a transfer unit is in pressure contact with the photosensitive drum 1.

The photosensitive drum 1 according to the present embodiment is an organic photosensitive member with negative chargeability. The photosensitive drum 1 includes a photosensitive layer on a drum-like base made of aluminum, and is rotationally driven at a predetermined process speed in a direction (clockwise) indicated by an arrow by a driving motor (driving portion) 110 (FIG. 2) serving as a drive unit. In the present embodiment, the process speed is 140 mm/sec, which corresponds to the circumferential velocity (surface movement speed) of the photosensitive drum 1. The photosensitive drum 1 has an outer diameter of 24 mm.

The charging roller 2 serving as a charging member is in contact with the photosensitive drum 1 at a predetermined pressure contact force to form a charging portion and is rotationally driven with respect to the photosensitive drum 1. The charging roller 2 may be driven and rotated in contact with the photosensitive drum 1. A charging voltage power supply 120 (FIG. 2) serving as a charging voltage application unit applies a desired charging voltage to the charging roller 2 to uniformly charge the surface of the photosensitive drum 1 with a predetermined potential. In the present embodiment, the charging roller 2 charges the surface of the photosensitive drum 1 to a negative polarity.

During a charging process, the charging voltage power supply 120 serving as the charging voltage application portion applies a predetermined charging voltage to the charging roller 2. In the present embodiment, during the charging process, a direct-current (DC) voltage having the negative polarity is applied to the charging roller 2 as the charging voltage. Thus, the surface of the photosensitive drum 1 is uniformly charged to a dark-area potential Vd. More specifically, the charging roller 2 charges the surface of the photosensitive drum 1 with an electric discharge occurring in at least one of small gaps formed between the charging roller 2 and the photosensitive drum 1 upstream and downstream of a contact portion with the photosensitive drum 1 in the rotational direction of the photosensitive drum 1. Assume herein that the contact portion between the charging roller 2 and the photosensitive drum 1 in the rotational direction of the photosensitive drum 1 corresponds to the charging portion.

The exposure device 4 serving as the exposure unit is a laser scanner device in the present embodiment. The exposure device 4 outputs laser light corresponding to image information input from an external apparatus, such as a host computer, and scans and exposes the surface of the photosensitive drum 1 to light. This exposure process forms an electrostatic latent image (electrostatic image) corresponding to image information on the surface of the photosensitive drum 1. In the present embodiment, the exposure by the exposure device 4 reduces the dark-area potential Vd formed on the surface of the photosensitive drum 1 in a uniform charging process in absolute value into a light-area potential Vl. Assume herein that the position where the photosensitive drum 1 is exposed to light by the exposure device 4 in the rotational direction of the photosensitive drum 1 corresponds to an exposure portion (exposure position). The exposure device 4 is not limited to the laser scanner device. For example, a light-emitting diode (LED) array including a plurality of LEDs arranged in the longitudinal direction of the photosensitive drum 1 may be adopted.

In the present embodiment, a contact developing method is used as a developing method. The developing device 3 includes a developing member, a developing roller 31 serving as a developer carrying member, a toner supply roller 32 serving as a developer supply unit, a developer accommodation chamber (developing container) 33, which contains toner, and a developing blade 34. When toner supplied from a developer accommodation chamber 33 to the developing roller 31 by the toner supply roller 32 passes through a blade nip corresponding to the contact portion between the developing roller 31 and the developing blade 34, the toner is charged to a predetermined polarity. At the developing portion, the toner carried on the surface of the developing roller 31 is transferred from the developing roller 31 to the surface of the photosensitive drum 1 according to the electrostatic image. Assume herein that the contact portion between the developing roller 31 and the photosensitive drum 1 in the rotational direction of the photosensitive drum 1 corresponds to the developing portion. In the present embodiment, the developing roller 31 and the photosensitive drum 1 are constantly in contact with each other. In the present embodiment, the developing roller 31 is rotationally driven counterclockwise so that the photosensitive drum 1 and the developing roller 31 move in the forward direction at the developing portion. The driving motor 110 serving as a drive unit that drives the developing roller 31 may function as the main motor 110 common to the drive unit of the photosensitive drum 1, like in the present embodiment.

Different driving motors, such as a photosensitive drum driving portion and a developing roller driving portion, may be used to rotate the photosensitive drum 1 and the developing roller 31, respectively. In a development process, a developing voltage power supply 140 (FIG. 2) serving as a developing voltage application unit applies a predetermined developing voltage to the developing roller 31. A control unit 200 controls the developing voltage power supply 140 to apply a DC voltage of −350 V to a metal core of the developing roller 31 as a developing voltage Vdc when the developing roller 31 and the photosensitive drum 1 are rotated in a contact state during an image-forming operation. During the image-forming operation, an electrostatic force generated due to a potential difference between the developing voltage Vdc of −350 V and an image-forming potential Vl of −100 V on the photosensitive drum 1 allows the toner carried on the developing roller 31 to be developed on the portion corresponding to the image-forming potential Vl on the photosensitive drum 1.

As for a potential or applied voltage in the following description, a greater absolute value on the negative polarity side (e.g., −1200 V compared to −600 V) is referred to as a higher potential, and a smaller absolute value on the negative polarity side (e.g., −350 V compared to −600 V) is referred to as a lower potential. This is because toner having negative chargeability is considered as a reference according to the present embodiment.

In the present embodiment, a voltage is expressed as a potential difference with respect to a ground potential (0 V). Accordingly, the developing voltage Vdc of −350 V is interpreted to have a potential difference of −350 V with respect to the ground potential due to the developing voltage applied to the metal core of the developing roller 31. This also holds true for the charging voltage, a transfer voltage, and the like.

In the present embodiment, a DC voltage having the negative polarity is applied as the developing voltage, and exposure is carried out after the charging process is performed uniformly. As a result, toner charged to the same polarity (negative polarity in the present embodiment) as the charging polarity of the photosensitive drum 1 adheres to an exposure surface (image portion) corresponding to an image-forming portion on the photosensitive drum 1 where the absolute value of the surface potential has decreased. This developing method is called a reversal developing method. In the present embodiment, it is assumed that the normal polarity of the toner charging polarity during the development process is the negative polarity. In the present embodiment, a mono-component non-magnetic contact developing method is used. However, the present invention is not limited to this method. For example, a two-component non-magnetic contact developing method, a non-contact developing method, or a magnetic developing method may be used. The two-component non-magnetic contact developing method is a method in which developer (magnetic brush) carried on the developer carrying member is brought into contact with the photosensitive drum 1 to perform the development process using two-component developer containing non-magnetic toner and magnetic carrier as developer. The non-contact developing method is a method in which the development process is performed by scattering toner onto the photosensitive member from the developer carrying member opposed to the photosensitive member in a non-contact state. The magnetic developing method is a method in which the development process is performed by carrying magnetic toner using a magnetic force on the developer carrying member that includes a built-in magnet as a magnetic field generation unit and is opposed to the photosensitive member in a contact state or a non-contact state. Toner used in the present embodiment has a center average particle diameter of 6 μm and a negative normal charging polarity.

The transfer roller 5 serving as a transfer member can suitably include an elastic member such as sponge rubber made of polyurethane rubber, ethylene propylene diene monomer (EPDM) rubber, nitrile-butadiene rubber (NBR), or the like. The transfer roller 5 is pressed against the photosensitive drum 1 to form a transfer portion where the photosensitive drum 1 and the transfer roller 5 are in press contact with each other. During a transfer process, a transfer voltage power supply 160 (FIG. 2) serving as a transfer voltage application unit applies a predetermined transfer voltage to the transfer roller 5. In the present embodiment, during the transfer process, a DC voltage of opposite polarity (positive polarity in the present embodiment) to the normal polarity of toner is applied to the transfer roller 5 as the transfer voltage.

A toner image is electrostatically transferred onto a recording material S from the photosensitive drum 1 by the action of an electric field formed between the transfer roller 5 and the photosensitive drum 1.

Each recording material S stored in a cassette 6 is fed by a sheet feed unit 7 in synchronization with the timing when the toner image formed on the photosensitive drum 1 reaches the transfer portion. The recording material S passes between a registration roller pair 8 and is conveyed to the transfer portion. The toner image formed on the photosensitive drum 1 is transferred onto the recording material S by the transfer roller 5 to which the predetermined transfer voltage is applied by the transfer voltage power supply 160 serving as a transfer voltage application portion.

The recording material S having the toner image transferred thereon is conveyed to a fixing device 9. The fixing device 9 is a film heating type fixing device including a fixing film 91 and a pressure roller 92. The fixing film 91 includes a built-in fixing heater (not illustrated) and a built-in thermistor (not illustrated) for measuring the temperature of the fixing heater. The pressure roller 92 is pressed against the fixing film 91. The toner image is fixed onto the recording material S by heating and pressurization. The recording material S then passes between a discharge roller pair 12 and is discharged out of the image-forming apparatus 100.

In the present embodiment, a brush 10 serving as a paper dust removal member is located in contact with the photosensitive drum 1 on the downstream of the transfer portion. The brush 10 removes the paper dust, which is transferred to the photosensitive drum 1 when the recording material S passes through the transfer portion, from the surface of the photosensitive drum 1.

In the present embodiment, a pre-exposure device 13 serving as a pre-charging exposure unit is located to average the potential on the photosensitive drum 1 after the transfer process on the downstream of the contact portion between the photosensitive drum 1 and the brush 10 and on the upstream of the charging portion in the rotational direction of the photosensitive drum 1. In the present embodiment, an LED (not illustrated) attached to a side surface of a main body is operated as the pre-exposure device 13 to execute irradiation in parallel to a main scanning direction of the photosensitive drum 1. In this case, a light guide or the like can also be used as a light guide member to prevent uneven irradiation in the main scanning direction.

Transfer residual toner that remains on the surface of the photosensitive drum 1 without being transferred onto the recording material S passes through the contact portion of the brush 10, and the potential on the photosensitive drum 1 is averaged by the pre-exposure device 13. Then, the transfer residual toner is charged to the negative polarity again by discharge at the charging portion on the charging roller 2. The transfer residual toner charged to the negative polarity again on the charging roller 2 reaches the developing portion along with the rotation of the photosensitive drum 1. The transfer residual toner that has reached the developing portion is transferred onto the surface of the developing roller 31 and is then collected into a developing container 33.

The brush 10 and the pre-exposure device 13 are provided in the configuration according to the present embodiment. However, the brush 10 and the pre-exposure device 13 may be omitted.

2. Control Unit

Figure 2:
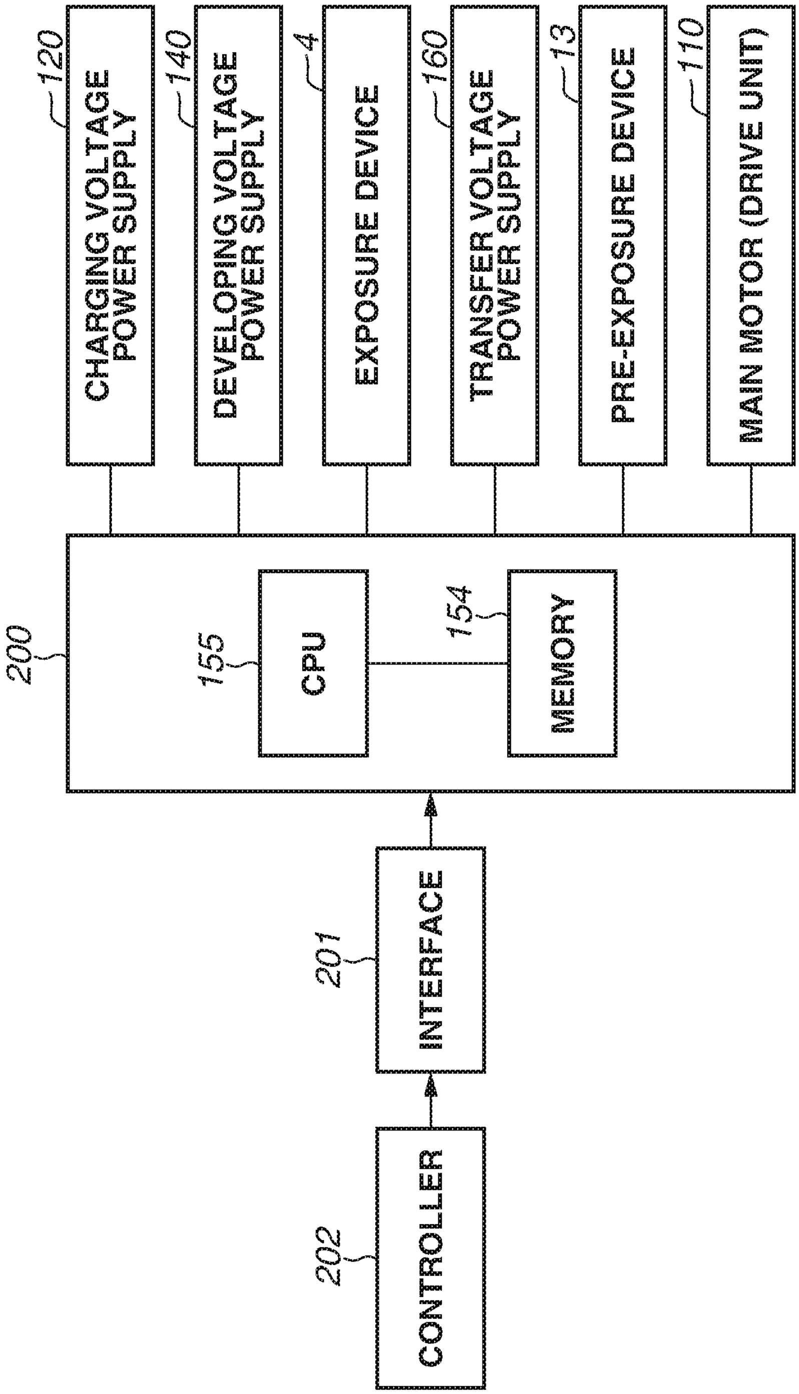
FIG. 2 is a control block diagram according to the first embodiment.

Next, the control unit 200 will be described. FIG. 2 is a control block diagram illustrating a schematic control configuration of main units of the image-forming apparatus 100 according to the present embodiment. A controller 202 exchanges various electric information with a host apparatus, and the control unit 200 controls the image-forming operation of the image-forming apparatus 100 in an integrated manner via an interface 201 based on a predetermined control program and a reference table. The control unit 200 includes a central processing unit (CPU) 155 as a central element that performs various calculation processing, and a memory 154 including a read-only memory (ROM) and a random access memory (RAM) as storage elements. The RAM stores sensor detection results, counter counting results, calculation results, and the like. The ROM stores control programs, data tables obtained by experiments in advance, and the like. The control unit 200 is connected to each control target, a sensor, a counter, and the like in the image-forming apparatus 100. The control unit 200 performs processing of exchanging various electric information signals, processing of controlling a predetermined image-forming sequence by controlling a driving timing or the like for each unit, and the like. For example, the voltage and the amount of exposure applied by the charging voltage power supply 120, the developing voltage power supply 140, the exposure device 4, the transfer voltage power supply 160, and the pre-exposure device 13 are controlled by the control unit 200. The control unit 200 also controls the main motor (driving portion) 110. The image-forming apparatus 100 performs the image-forming operation on each recording material S based on an electrical image signal input to the controller 202 from the host apparatus. Examples of the host apparatus include an image reader, a personal computer (PC), a facsimile, and a smartphone.

3. Toner Contamination on Charging Roller

In the present embodiment, the surface of the photosensitive drum 1 includes an area where the electrostatic latent image is formed and the image-forming portion is formed, and an area where the electrostatic latent image is not formed and a non-image-forming portion is formed. The behavior of the transfer residual toner adhering to each of the image-forming portion and the non-image-forming portion of the photosensitive drum 1 during the image-forming operation will be described.

The transfer residual toner adhering to the image-forming portion of the photosensitive drum 1 is not transferred to the developing roller 31 from the photosensitive drum 1 in the developing portion, and is moved to the transfer portion together with the developed toner from the developing roller 31 and is transferred onto the recording material S and used for the image-forming operation.

On the other hand, the transfer residual toner adhering to the non-image-forming portion of the photosensitive drum 1 is charged to the negative polarity again as the normal polarity by the charging portion. In the developing portion, the transfer residual toner is transferred to the developing roller 31 due to the potential difference between the potential of the non-image-forming portion of the photosensitive drum 1 and the developing voltage, and is then collected into the developer accommodation chamber 33. The toner collected into the developer accommodation chamber 33 is reused for the image-forming operation.

The toner, including the transfer residual toner, remaining on the surface of the photosensitive drum 1 after the transfer process passes through the charging portion corresponding to the contact portion between the photosensitive drum 1 and the charging roller 2 before passing through the developing portion. Accordingly, the toner is brought into contact with the charging roller 2 that is in physical contact with the surface of the photosensitive drum 1. In the configuration in which the developing roller 31 and the photosensitive drum 1 are constantly in contact with each other as in the present embodiment, the following phenomenon occurs, for example, when the developing container 33 is new or after a lapse of a long time since the last printing. In the above-described case, if the toner in the developing container 33 has low chargeability, the potential difference formed between the photosensitive drum 1 and the developing roller 31 is not sufficient to hold the toner on the surface of the developing roller 31. As a result, a larger amount of toner is transferred onto the surface of the photosensitive drum 1. The phenomenon in which toner is transferred onto the surface of the photosensitive drum 1 due to the potential difference (back contrast) formed between the non-image-forming area of the photosensitive drum 1 and the developing roller 31 is referred to as "fogging". Toner transferred onto the surface of the photosensitive drum 1 during fogging is referred to as "fogging toner". In the configuration according to the present embodiment, during the period from the time when the developing container 33 is new to the time when about 100 sheets are fed, the toner has low chargeability and the amount of fogging toner is large. Since the toner transferred onto the surface of the photosensitive drum 1 has low chargeability, the toner transferred onto the surface of the photosensitive drum 1 contaminates the charging roller 2 even when the potential difference formed between the charging roller 2 and the photosensitive drum 1 is set to the potential difference at which the toner having the negative polarity is less likely to be transferred to the charging roller 2. If the toner adhering to the charging roller 2 is subjected to discharge when the charging voltage higher than or equal to the discharge threshold is applied in the charging portion, the toner is charged to the positive polarity. The toner charged to the positive polarity firmly adheres to the surface of the charging roller 2 to which the voltage having the negative polarity is applied. In particular, toner having a relatively small particle diameter is more likely to be charged. Accordingly, under a condition in which the ratio of toner with a smaller particle diameter is high in fogging toner, the amount of toner that contaminates the charging roller 2 is large, which makes it difficult to move the toner onto the surface of the photosensitive drum 1 from the charging roller 2. Toner that is more likely to be charged and has a smaller mass and a smaller particle diameter can more easily move with respect to an electric field and is preferentially consumed as developer. Therefore, the ratio of toner with a smaller particle diameter in the developing container 33 that is filled with new toner is higher than that in the developing container 33 that is filled with toner held for a long time. In the case of an image-forming apparatus 300 (FIGS. 9A and 9B) in which the developing device 3, the developing container 33, or a developer supply container 41 to be connected to the developing container 33 as described below is replaced with a new one, the following phenomenon occurs.

After the developing device 3 or the developing container 33 is replaced with a new one, or after toner is replenished to the developing container 33, the ratio of toner with a smaller particle diameter is high. Accordingly, the amount of fogging toner is large when the developing container 33 or the toner container is replaced with a new one, or after toner is replenished. When the ratio of toner with a smaller particle diameter is high in fogging toner and the cleanerless configuration similar to that used in the present embodiment is employed, most of the fogging toner reaches the charging portion corresponding to the contact portion of the charging roller 2. Accordingly, the amount of toner that contaminates the charging roller 2 is large. When the charging voltage higher than or equal to the discharge threshold is applied in this state, the toner that is more likely to be charged and has a smaller particle diameter is charged to the polarity opposite to the charging voltage, and firmly adheres to the charging roller 2. A configuration for replenishing toner will be described in a modified example to be described below with reference to FIGS. 9A and 9B.

When a cleaning operation is executed as an operation to transfer the toner adhering to the surface of the charging roller 2 onto the surface of the photosensitive drum 1, a force for moving the toner to the photosensitive drum 1 from the charging roller 2 is proportional to the potential difference formed between the charging roller 2 and the photosensitive drum 1. Accordingly, a force for cleaning the surface of the charging roller 2 increases as the potential difference increases. For this reason, a larger potential difference in the charging voltage lower than or equal to the discharge threshold enables cleaning of the surface of the charging roller 2 while preventing strong charging of toner with a smaller particle diameter. However, toner having a relatively large particle diameter has lower chargeability and a larger mass, and thus is less likely to react to an electric field. At the potential difference lower than or equal to the discharge threshold, the cleaning force may be insufficient.

To effectively perform the cleaning operation on the charging roller 2, the charging voltage that is higher than the surface potential on the photosensitive drum 1 and the charging voltage that is lower than the surface potential on the photosensitive drum 1 are applied. For example, when the surface potential formed on the surface of the photosensitive drum 1 is charged to −600 V and the charging voltages are switched between −1200 V and 0 V, a potential difference of 600 V is formed for each of the toner having the negative polarity and the toner having the positive polarity on the charging roller 2. This makes it possible to efficiently move (discharge) the toner having the positive polarity and the toner having the negative polarity on the charging roller 2 to the surface of the photosensitive drum 1. Control processing for alternately applying two levels of voltages is performed as control processing for the cleaning operation on the surface of the charging roller 2. The control processing for alternately applying two levels of charging voltages has such an advantageous effect that the force for moving the toner to the surface of the photosensitive drum 1 from the charging roller 2 can be increased using a large potential gradient generated when the charging voltages are switched.

4. Control for Cleaning Operation on Charging Roller Surface

Control Processing According to First Conventional Embodiment

Figure 3:
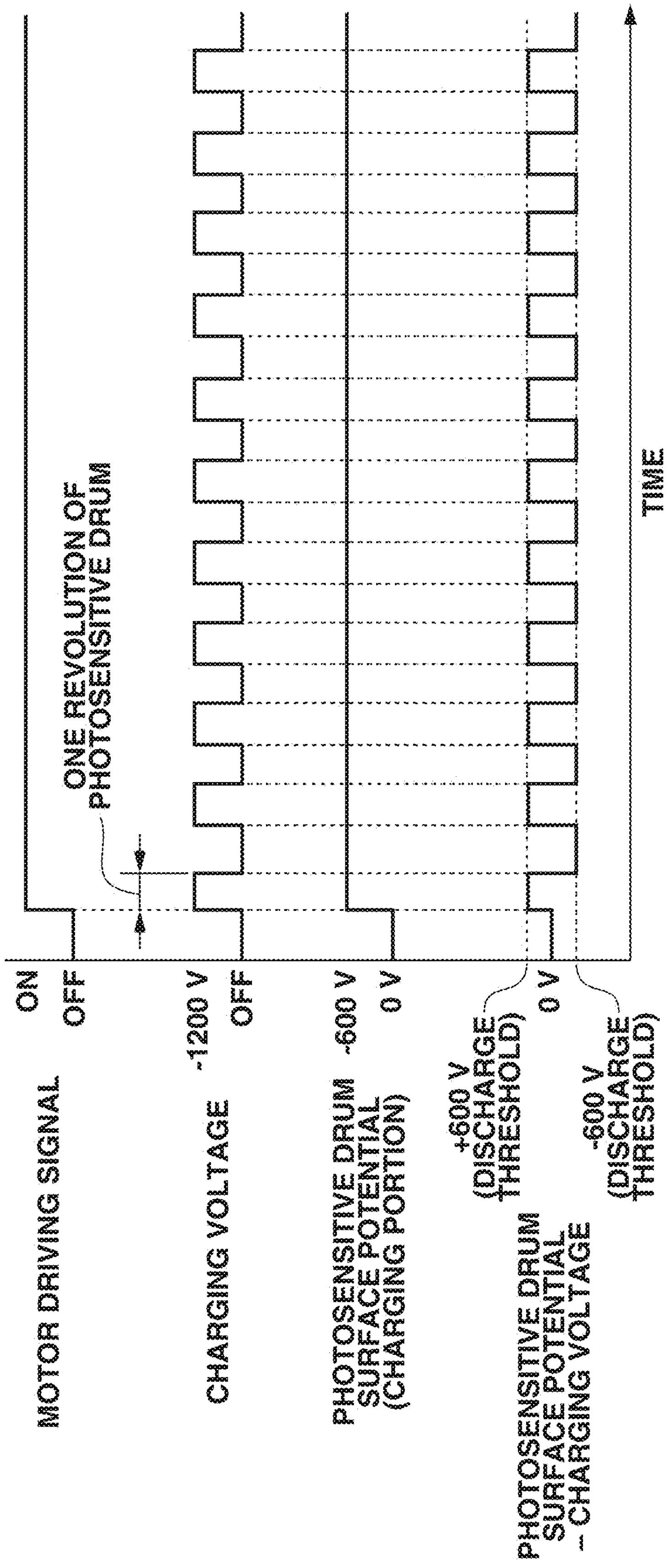
FIG.3 Prior Art
FIG. 3 is a timing diagram illustrating an operation of the image-forming apparatus according to a first conventional embodiment.

Next, control processing according to a first conventional embodiment will be described with reference to FIG. 3 to facilitate understanding of various potential control processing according to the present embodiment. FIG. 3 illustrates a cleaning operation to be executed on the surface of the charging roller 2 when the developing container 33 is new in the image-forming apparatus according to the first conventional embodiment.

FIG. 3 illustrates, in order from the top, a driving signal from the motor 110 serving as the driving portion to drive the photosensitive drum 1 and the like, the charging voltage to be applied to the charging roller 2, the surface potential on the photosensitive drum 1, and a temporal transition of the difference between the surface potential on the photosensitive drum 1 and the charging voltage to be applied to the charging roller 2. A voltage of −1200 V corresponding to one revolution of the photosensitive drum 1 is applied to the charging roller 2 and the surface of the photosensitive drum 1 is charged with −600 V, and then two levels of voltages of −1200 V and 0 V (OFF) are alternately applied 10 times. After that, control processing for alternately applying two levels of voltages is performed as control processing for the cleaning operation on the surface of the charging roller 2.

Operation of First Conventional Embodiment

Figure 4A:
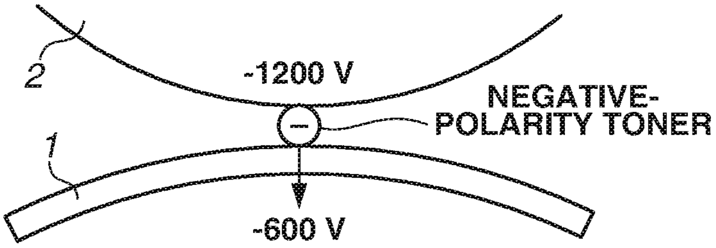
FIGS. 4A and 4B each illustrate a mechanism in which toner on a charging roller according to the first embodiment is transferred onto the surface of a photosensitive drum.
Figure 4B:
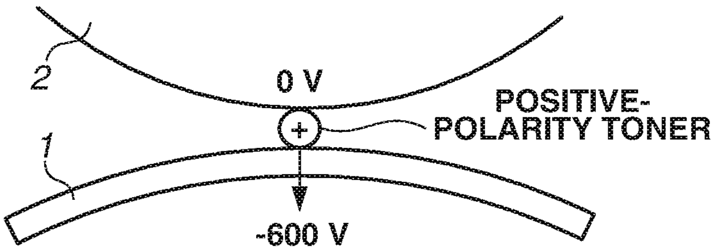

Like in the first conventional embodiment, the potential difference of 600 V is formed for the toner having the positive polarity and the toner with the negative polarity with respect to the surface potential of −600 V on the photosensitive drum 1, thereby transferring the toner onto the surface of the photosensitive drum 1 from the charging roller 2. As illustrated in FIGS. 4A and 4B, the toner having the positive polarity and the toner having the negative polarity on the surface of the charging roller 2 are moved to the surface of the photosensitive drum 1 due to the potential difference formed between the surface of the photosensitive drum 1 and the surface of the charging roller 2. On the other hand, after the operation according to the first conventional embodiment, a charge distribution on the charging roller 2 is measured by an E-spart analyzer (manufactured by Hosokawa Micron Corporation). Table 1 illustrates the results of calculating the ratio of positively charged toner. In Table 1, "Non-application of Charging Voltage" indicates the result of measuring the amount of toner adhering to the charging roller 2 after the toner is discharged from the developing device when the charging roller 2 is driven without applying the charging voltage. Table 1 shows that the amount of toner that has the positive polarity and remains on the charging roller 2 in the first conventional embodiment is larger than that during non-application of charging voltage. The discharge threshold in the present embodiment is about 600 V. If the surface of the charging roller 2 is cleaned at the charging voltage higher than or equal to the discharge threshold, the toner on the surface of the charging roller 2 is charged to the positive polarity by the discharge, which leads to an increase in adhesive force between the charging roller 2 and the toner. The high adhesive force makes it difficult to remove the toner from the surface of the charging roller 2 even when the surface of the charging roller 2 is to be cleaned after that. When a half-tone image is printed after the operation according to the first conventional embodiment, an uneven density image corresponding to the periodicity of the charging roller 2 is generated. This is because an uneven density occurs due to the toner that has the positive polarity and remains on the surface of the charging roller 2.

TABLE 1

| | Non-application of charging voltage | First Conventional Embodiment | Second Conventional Embodiment |
|---|---|---|---|
| Ratio of Positively Charged Toner | 37% | 64% | 41% |

Control Processing According to Second Conventional Embodiment

Figure 5:
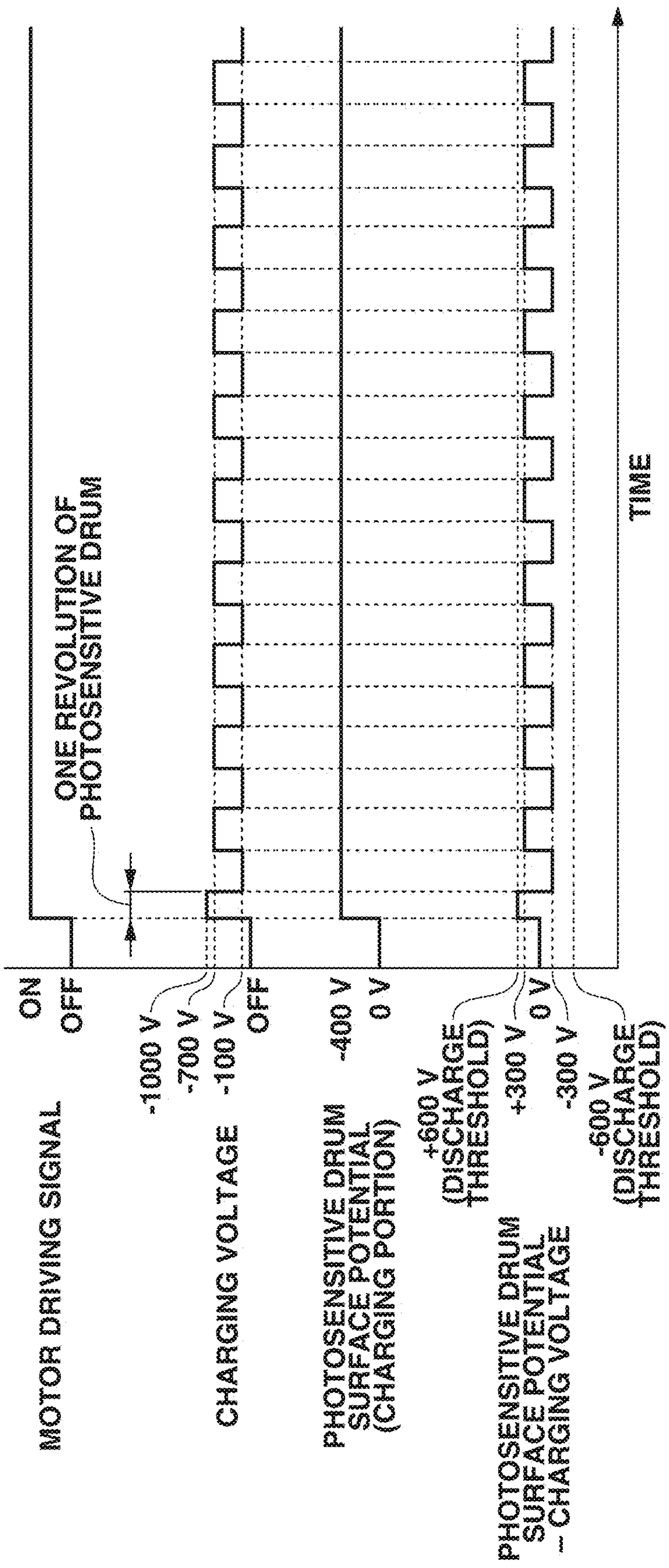
Prior Art FIG.5
FIG. 5 is a timing diagram illustrating an operation of an image-forming apparatus according to a second conventional embodiment.

Next, control processing according to a second conventional embodiment will be described with reference to FIG. 5 to facilitate understanding of various potential control processing according to the present embodiment. FIG. 5 illustrates a cleaning operation to be executed on the charging roller 2 when the developing container 33 is new in the image-forming apparatus 100 according to the second conventional embodiment. FIG. 5 illustrates, in order from the top, a driving signal from the main motor 110 to drive the photosensitive drum 1, the charging roller 2, and the developing roller 31, the charging voltage to be applied to the charging roller 2, the surface potential on the photosensitive drum 1, and a temporal transition of the difference between the surface potential on the photosensitive drum 1 and the charging voltage. A voltage of −1000 V corresponding to one revolution of the photosensitive drum 1 is first applied to the charging roller 2 and the surface of the photosensitive drum 1 is charged with −400 V, and then two levels of charging voltages of −700 V and −100 V are alternately applied 10 times.

Operation of Second Conventional Embodiment

Unlike in the first conventional embodiment, in the second conventional embodiment, a potential difference lower than or equal to the discharge threshold is set as the potential difference formed between the charging roller 2 and the surface of the photosensitive drum 1. The potential difference makes it possible to discharge the toner having a relatively positive polarity and higher chargeability and the toner having a relatively negative polarity and higher chargeability on the charging roller 2 to the photosensitive drum 1, although the potential difference is small like in the case of FIGS. 4A and 4B. After the operation according to the second conventional embodiment, as described above in the operation according to the first conventional embodiment, the results of measuring the charge distribution of toner adhering to the charging roller 2 as illustrated in Table 1 are obtained. To clean the toner having the positive polarity and toner having the negative polarity, it may be desirable to charge the surface of the photosensitive drum 1. Since the charging voltage higher than or equal to the discharge threshold is first applied for a short period of time, although the ratio of the positively charged toner tends to increase, the ratio of toner having the positive polarity increases by about 4% compared with that during non-application of charging voltage.

In the second conventional embodiment, the discharge threshold is about 600 V, and the charging roller 2 is cleaned with the surface potential on the photosensitive drum 1 and the charging voltage that is not discharged. Accordingly, the amount of toner charged to the positive polarity by the discharge is small, and the adhesive force between the charging roller 2 and the toner is not increased. After the operation according to the second conventional embodiment, when a half-tone image is printed, an uneven density image corresponding to the periodicity of the charging roller 2 is generated. This is because the cleaning performance of the charging roller 2 has decreased, so that the toner remained on the surface of the charging roller 2, which resulted in the uneven density.

That is, the amount of toner having the positive polarity is decreased by setting the charging voltage to be lower than or equal to the discharge threshold and decreasing the amount of discharge between the charging roller 2 and the photosensitive drum 1. However, the cleaning performance of the charging roller 2 has decreased due to the small potential difference between the charging roller 2 and the photosensitive drum 1.

Control Processing According to Present Embodiment

Figure 6:
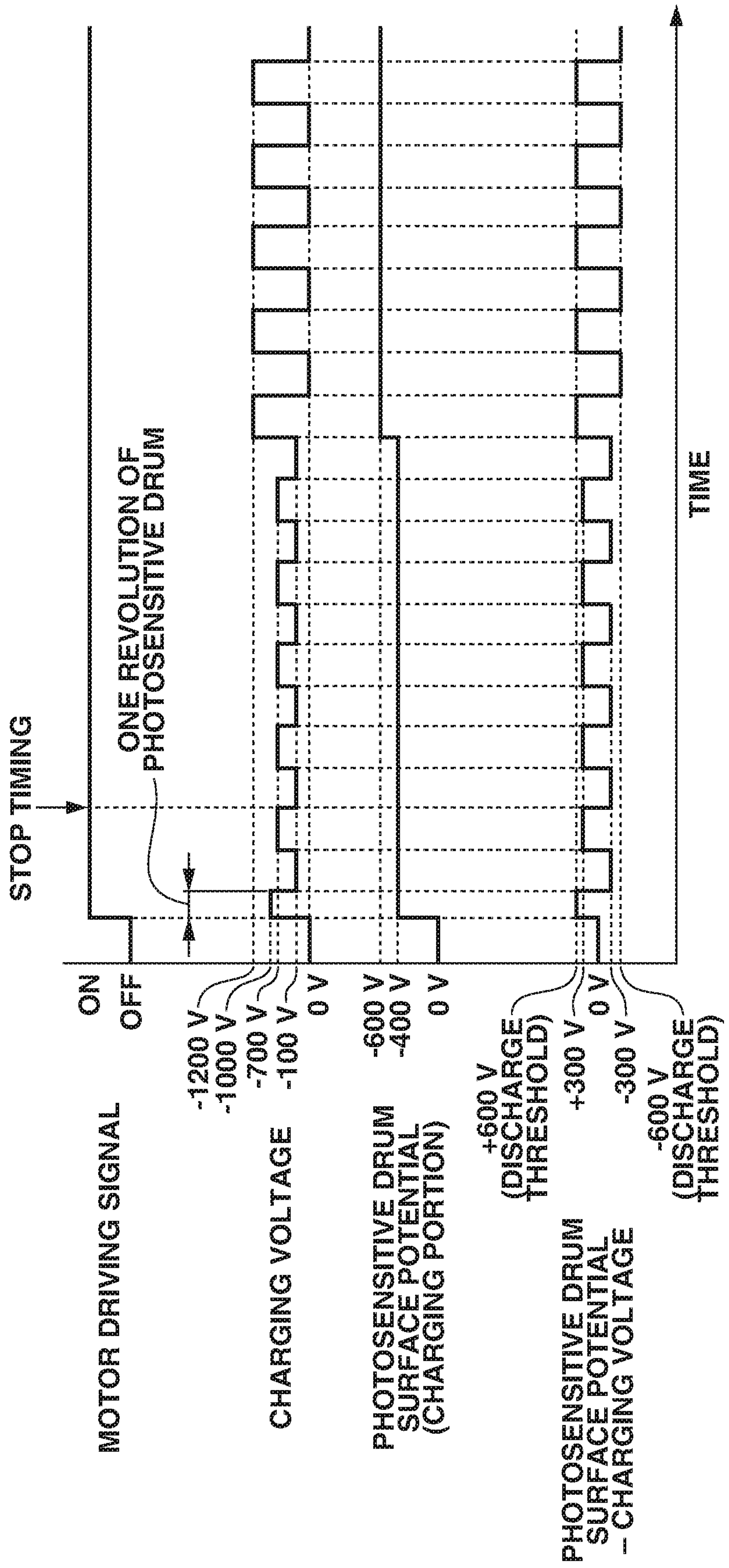
FIG. 6 is a timing diagram illustrating an operation of the image-forming apparatus according to the first embodiment.

Accordingly, in the present embodiment, as illustrated in FIG. 6, the surface of the charging roller 2 is cleaned by switching the charging voltage so that the potential difference with respect to the surface of the photosensitive drum 1 is lower than or equal to the discharge threshold. Then, the surface of the charging roller 2 is cleaned by switching the charging voltage with the potential difference more than or equal to the discharge threshold. First, a voltage of −1000 V corresponding to one revolution of the photosensitive drum 1 is applied to the charging roller 2 and the surface of the photosensitive drum 1 is charged with −400 V, and then two levels of voltages of −700 V and −100 V are alternately applied five times. After that, control processing for alternately applying two levels of voltages of −1200 V and 0 V (OFF) five times is performed.

Operation of Present Embodiment

Next, the operation of the control processing according to the present embodiment when surface of the charging roller 2 is cleaned will be described.

The discharge threshold according to the present embodiment is about 600 V, and the cleaning operation is performed with the potential difference (300 V in the present embodiment) that is less than or equal to the discharge threshold, thereby allowing the toner having relatively higher chargeability in the toner adhering to the charging roller 2 to be selectively transferred onto the surface of the photosensitive drum 1. After that, a larger potential difference is formed to execute the transfer operation in which the residual toner that has relatively low chargeability on the charging roller 2 and is less likely to be charged with high chargeability even when the toner is discharged between the charging roller 2 and the photosensitive drum 1 is transferred to the surface of the photosensitive drum 1.

Description of Advantageous Effects

Two test methods, including a tape test conducted to confirm the advantageous effects of the present embodiment and sheet-feeding experiments, and the test results will be described below.

The tape test was conducted under the following conditions. That is, a new developing container 33 is set in the image-forming apparatus 100 under the environment in which the temperature is 25° C. and the relative humidity is 50% (normal temperature, normal humidity environment), and the photosensitive drum 1, the charging roller 2, and the developing roller 31 are rotationally driven for five seconds. Accordingly, fogging toner is transferred from the developing roller 31 to the photosensitive drum 1 and brought to the charging roller 2. After that, control processing for cleaning the surface of the charging roller 2 according to each embodiment is carried out and a tape (polyester tape No. 5511 manufactured by NICHIBAN Co., Ltd.) is attached to the surface of the charging roller 2, and then the tape is peeled off and attached to white paper. By the above-descried process, the amount of toner remaining on the surface of the charging roller 2 can be quantified as densities to be compared. A spectral density meter (eXact Basic) manufactured by X-Rite, Inc. is used in this case as a density meter. A smaller value indicates a lower density and a smaller amount of toner remaining on the charging roller 2, which indicates that the cleaning operation on the charging roller 2 can be effectively performed.

Sheet-feeding experiments were conducted under the following conditions. After the tape test is conducted, Xerox Vitality Multipurpose Printer Paper (product name, grammage: 75 g) manufactured by Xerox Corporation is used as the recording material S and a half-tone image with a density of 25% is printed on one sheet. In this case, if an uneven density image corresponding to the periodicity of the charging roller 2 is generated due to toner contamination on the charging roller 2, it is determined that the cleaning operation is "NG" because of toner contamination on the charging roller 2.

Table 2 illustrates the results of evaluating the tape density in the above-described tape test and images obtained by sheet-feeding experiments when the cleaning operation on the charging roller 2 is not performed and when the control processing according to the first conventional embodiment, the second conventional embodiment, and the present embodiment is performed. If the tape density is less than 0.5, there is almost no effect on the image to be actually output.

TABLE 2

| | Charging Voltage during Cleaning on Charging Roller | Tape Density | Image |
|---|---|---|---|
| No Cleaning Operation on Charging Roller | (Not performed) | 1.3 | NG |
| First Conventional Embodiment | Charging Voltage ≥ Discharge Threshold | 1.1 | NG |
| Second Conventional Embodiment | Charging Voltage ≤ Discharge Threshold | 0.7 | NG |
| Present Embodiment | Charging Voltage ≤ Discharge Threshold, then Charging Voltage ≥ Discharge Threshold | 0.2 | OK |

In the first conventional embodiment in which the cleaning operation on the charging roller 2 is performed at the charging voltage higher than or equal to the discharge threshold, the toner on the charging roller 2 is positively charged at a high level as described above, which leads to an increase in the adhesive force on the charging roller 2. The tape test results in Table 2 show that the difference between the tape density in the first conventional embodiment and the tape density when the cleaning operation on the charging roller 2 is not performed is only 0.2 and the toner having the positive polarity remains on the charging roller 2, which indicates that the cleaning operation is less effective. The sheet-feeding test results also show that an uneven density corresponding to the periodicity of the charging roller 2 occurs, which indicates "NG".

In the second conventional embodiment in which the cleaning operation on the charging roller 2 is performed at the charging voltage lower than or equal to the discharge threshold, as described above, the cleaning operation is effective for toner having higher chargeability. However, since the potential difference is small for the toner having lower chargeability, the force for transferring the charging roller 2 to the photosensitive drum 1 is insufficient. Accordingly, the difference between the tape density in the second conventional embodiment and the tape density when the cleaning operation on the charging roller 2 is not performed is only 0.6, and the sheet-feeding test result also shows "NG".

On the other hand, in the present embodiment in which the cleaning operation on the charging roller 2 is first performed at the charging voltage lower than or equal to the discharge threshold and then the cleaning operation on the charging roller 2 is performed at the charging voltage higher than or equal to the discharge threshold, the difference between the tape density in the present embodiment and the tape density when the cleaning operation on the charging roller 2 is not performed is "1.1", which is a large difference. The tape density of 0.2 in the present embodiment has almost no influence of the toner. The sheet-feeding test results also show that an uneven density image is not generated, which indicates "OK".

The configuration according to the first embodiment includes the following features. The image-forming apparatus 100 configured to execute the image-forming operation to form an image on each recording material S has the following configuration. That is, the image-forming apparatus 100 includes the photosensitive drum 1, the main motor 110 that rotationally drives the photosensitive drum 1, and the charging roller 2 that is in contact with the surface of the photosensitive drum 1 to form the charging portion and is configured to charge the surface of the photosensitive drum 1 in the charging portion. The image-forming apparatus 100 also includes the developing roller 31 that supplies developer charged to the normal polarity onto the surface of the photosensitive drum 1, the charging voltage application portion 120 that applies the charging voltage to the charging roller 2, and a control unit 200 that controls the main motor 110 and the charging voltage application portion 120.

The control unit 200 controls the image-forming operation and the non-image-forming operation to be executable. The non-image-forming operation is an operation to apply the charging voltage to the charging roller 2 in a state where the photosensitive drum 1 is rotated. In the non-image-forming operation, the control unit 22 executes the following control processing:

i) a first step of not discharging electric charge between the charging roller 2 and the photosensitive drum 1 and applying a first charging voltage having a first polarity with respect to the surface potential formed on the surface of the photosensitive drum 1 to the charging roller 2;

ii) a second step of not discharging, after the first step, electric charge between the charging roller 2 and the photosensitive drum 1 and applying a second charging voltage having a polarity opposite to the first polarity with respect to the surface potential to the charging roller 2; and iii) a third step of applying, after the second step, a third charging voltage having a second polarity with respect to the surface potential to the charging roller 2 and applying a fourth charging voltage having a polarity opposite to the second polarity with respect to the surface potential to the charging roller 2. Control processing is performed to discharge electric charge between the charging roller 2 and the photosensitive drum 1 when at least one of the third charging voltage and the fourth charging voltage is applied as the charging voltage.

As described above, in control processing according to the present embodiment, the cleaning operation on the charging roller 2 is performed at the charging voltage lower than or equal to the discharge threshold, thereby allowing toner having relatively high chargeability to be selectively transferred onto the surface of the photosensitive drum 1. After that, the potential difference is increased to thereby make it possible to move the toner having relatively low chargeability onto the surface of the photosensitive drum 1. Consequently, it is possible to prevent generation of an uneven density image corresponding to the periodicity of the charging roller 2 when the amount of toner adhering to the charging roller 2 is large.

The first polarity and the second polarity may be set to the same polarity, or may be set to opposite polarities. In other words, in the first step and the third step, the application of the charging voltage may be started from the normal polarity with respect to the surface potential on the photosensitive drum 1, or may be started from the opposite polarity. Further, control processing is performed such that a first repetitive operation to repetitively execute the first step and the second step is executed. Further, control processing is performed such that a second repetitive operation to repetitively execute the third step is executed.

The developing container 33 that contains developer may be provided and the developing container 33 may be configured such that the developer supply container 41 can be detachably mounted. In this configuration, control processing may be performed such that the non-image-forming operation is executed after the developer supply container 41 is mounted on the developing container 33 and developer is supplied into the developing container 33. The developing container 33 may be detachably mounted on the image-forming apparatus 100, and control processing may be performed such that the non-image-forming operation is executed after the developing container 33 is replaced with a new one.

Figure 9A:
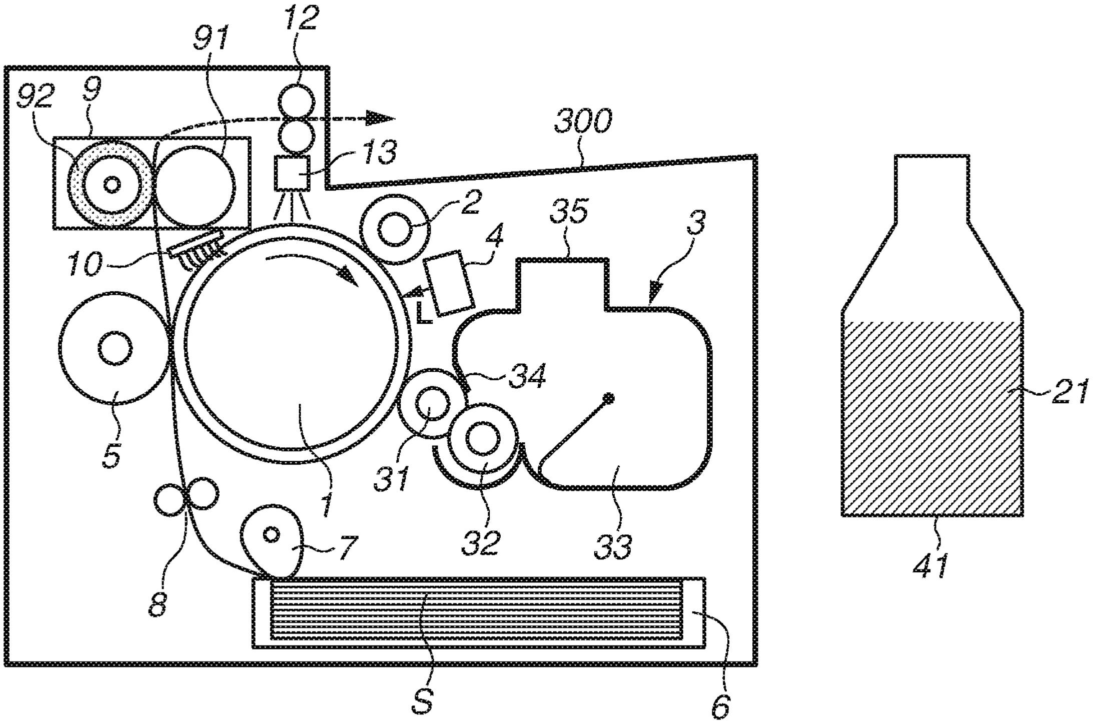
FIGS. 9A and 9B are schematic views each illustrating an image-forming apparatus according to other modes in the first embodiment.
Figure 9B:
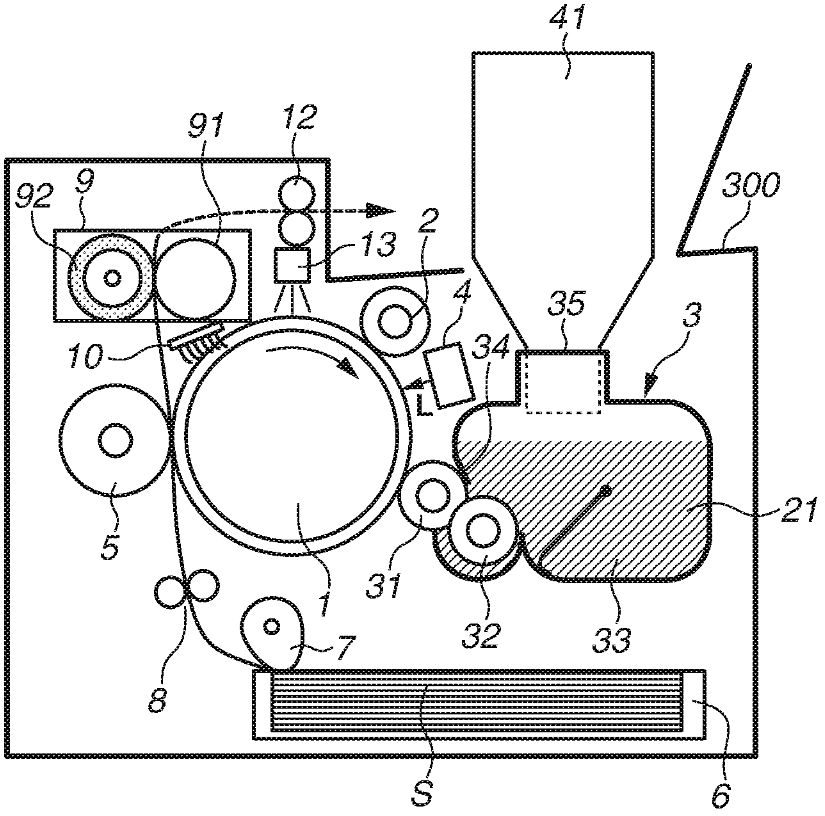

For example, a configuration for supplying toner using a direct supply method will be described as a modified example of the present embodiment. As illustrated in FIG. 9A, the image-forming apparatus 300 according to the present embodiment is provided with an opening 35 through which a toner bottle can be attached, and toner can be supplied through the opening 35. As illustrated in FIG. 9B, a toner bottle serving as the developer supply container 41 is attached to the opening 35 and toner is transferred into the developing container 33 from the toner bottle 41 due to the gravitational force, thereby making it possible to supply toner without the need for a special device such as a toner supply path.

When toner 21 encapsulated in the toner bottle 41 illustrated in FIG. 9A is supplied into the developing container 33 illustrated in FIG. 9A, almost all the toner 21 in the toner bottle 41 is stored in the developing container 33 as illustrated in FIG. 9B. The developing container 33 extends in the longitudinal direction and has a volume sufficient to store all the toner 21 in the toner bottle 41.

According to the present embodiment, in a section in which the charging voltage higher than or equal to the discharge threshold is applied, the charging voltage higher than or equal to the discharge threshold is applied to both the positively charged toner and the negatively charged toner, but instead may be applied only to one of the positively charged toner and the negatively charged toner based on, for example, the easiness of charging toner to be treated or the easiness of reversal to the positive polarity. For example, when the developing container is new, or after developer is replenished, the amount of toner that is more easily reversed to the positive polarity opposite to the normal polarity and has a smaller particle diameter is large. Based on this phenomenon, the application of the charging voltage higher than or equal to the discharge threshold to one or both of the positively charged toner and the negatively charged toner may be switched based on the degree of durability (the number of printed sheets, the amount of consumed toner, the number of revolutions of the photosensitive drum 1, the number of revolutions of the developing roller 31, etc.) in the section in which the voltage higher than or equal to the discharge threshold is applied. In the present embodiment, the amount of toner filled in a new developing container is 120 g. In this case, for example, in the case of printing with a printing ratio of 5% (a printing area ratio when an entirely black image is 100% and an entirely white image is 0%), it is known that the ratio of toner with a smaller particle diameter can be suppressed when about 100 sheets are fed. Accordingly, the operation similar to the operation to be performed during the rotation operation after image printing in the present embodiment is carried out until 100 sheets are fed. After that, the ratio of toner that is more likely to be charged to the positive polarity and has a smaller particle diameter is sufficiently decreased. Therefore, the operation of increasing the cleaning performance on the charging roller 2 may be executed by executing the operation similar to the operation according to the first conventional embodiment in which the potential difference between the charging roller 2 and the surface of the photosensitive drum 1 is large. Thus, the post-rotation operation may be switched based on the amount of toner to be supplied, the printing ratio, the amount of consumed toner, or the like.

In the present embodiment, the advantageous effects of cleaning the charging roller 2 have been described above. The same advantageous effects can also be obtained by carrying out the cleaning operation according to the present embodiment on other members, such as the transfer roller 5 and the brush 10, that are in contact with the surface of the photosensitive drum 1 serving as the image bearing member.

In addition, the value of the charging voltage, the number of times of switching the charging voltage, the period for applying the charging voltage, and the like may be adjusted based on variations in capacitance due to abrasion on the surface layer of the photosensitive drum 1, the degree of deterioration in cleaning performance due to degradation of toner, or the temperature and humidity in the environment according to the durability state.

Next, other embodiments of the present invention will be described. The basic configuration and operation of image-forming apparatuses according to other embodiments are similar to those of the image-forming apparatus 100 according to the first embodiment. Accordingly, in the image-forming apparatus according to the present embodiment, elements having functions or configurations identical or corresponding to those of the image-forming apparatus 100 according to the first embodiment are denoted by the same reference numerals as those of the image-forming apparatus 100 in the first embodiment, and the detailed descriptions thereof are omitted.

1. Control for Cleaning Operation on Charging Roller Surface

Control According to Present Embodiment

Figure 7:
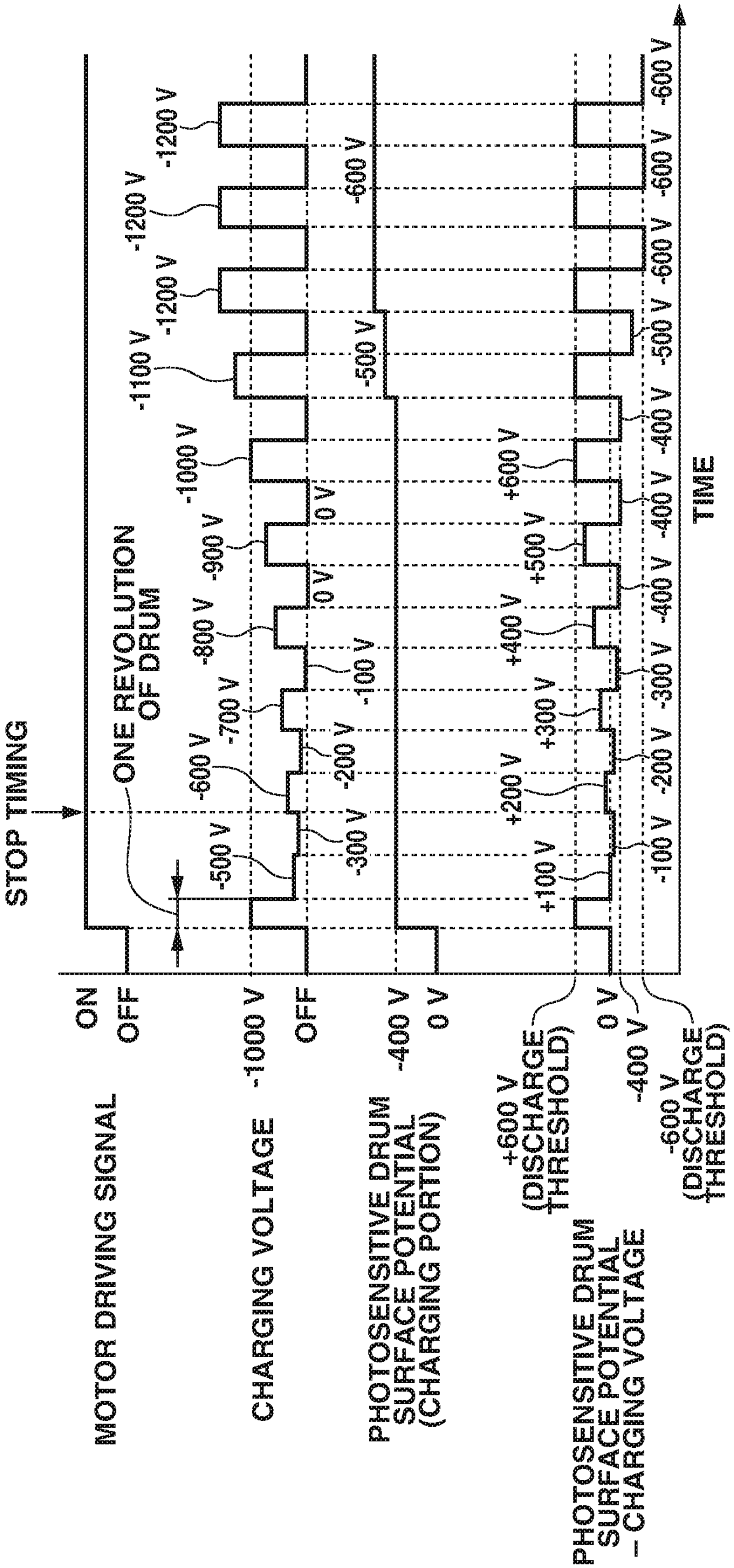
FIG. 7 is an explanatory diagram illustrating an operation of an image-forming apparatus according to a second embodiment.

Next, processing for controlling the charging voltage according to the present embodiment will be described with reference to FIG. 7. FIG. 7 illustrates a cleaning operation to be performed on the charging roller 2 when the developing container 33 is new in the image-forming apparatus 100 according to the present embodiment. The other operations are similar to those of the first embodiment. In the present embodiment, the charging voltage is controlled to be gradually varied. In the first embodiment, two levels of voltages lower than or equal to the discharge threshold are used as the charging voltage. In the present embodiment, two levels or more of charging voltages are applied in the direction in which the potential difference is gradually increased. More specifically, the charging voltages are applied in the direction in which the absolute value of the potential difference formed between the charging voltage and the surface potential on the photosensitive drum 1 is gradually increased from 100 V by the amount corresponding to 100 V.

Description of Advantageous Effects

Table 3 illustrates the results of tests conducted in the same manner as in the first embodiment in the control processing according to the above-described embodiments and the results of comparison with the first embodiment.

TABLE 3

| | Charging Voltage during Cleaning on Charging Roller | Tape Density | Image | Ratio of Positively Charged Toner |
|---|---|---|---|---|
| First Embodiment | Charging Voltage ≤ Discharge Threshold, then Charging Voltage ≥ Discharge Threshold (Two Levels of Voltages) | 0.2 | OK | 43% |
| Second Embodiment | Charging Voltage ≤ Discharge Threshold, then Charging Voltage ≥ Discharge Threshold (in Direction in which Potential Difference is Increased) | 0.4 | OK | 43% |

These results show that the same performance as that obtained in the first embodiment can be obtained for the image and the ratio of positively charged toner. However, the tape density in the present embodiment is larger than that in the first embodiment. This is because, since the force to be applied to the toner on the surface of the charging roller 2 is proportional to the potential difference, if the entire cleaning operation on the charging roller 2 is performed for the same period of time, the number of times a relatively large potential difference is formed in the charging voltage lower than or equal to the discharge threshold in the present embodiment is smaller than that in the first embodiment. Nevertheless, in a second embodiment, the tape density is less than 0.5, which has almost no influence on the image to be actually output.

On the other hand, in the present embodiment, the amount of toner to be transferred onto the surface of the photosensitive drum 1 from the charging roller 2 at a time can be reduced. Table 4 illustrates the results of the tape test conducted according to the first embodiment on the photosensitive drum 1 immediately after the cleaning operation on the charging roller 2 is started. Specifically, in the first embodiment, the image forming operation was forcibly stopped at a stop timing illustrated in FIG. 6, and in the present embodiment, the image forming operation was forcibly stopped at a stop timing illustrated in FIG. 7. At this timing, the tape test was performed on the photosensitive drum 1 immediately after passing through the charging portion corresponding to the contact portion between the charging roller 2 and the photosensitive drum 1.

TABLE 4

| | Charging Voltage during Cleaning on Charging Roller | Tape Density Discharge from Charging Roller |
|---|---|---|
| First Embodiment | Charging Voltage ≤ Discharge Threshold, then Charging Voltage ≥ Discharge Threshold (Two Levels of Voltages) | 0.3 |
| Second Embodiment | Charging Voltage ≤ Discharge Threshold, then Charging Voltage ≥ Discharge Threshold (in Direction in which Potential Difference is Increased) | 0.1 |

These results show that the amount of toner to be transferred onto the surface of the photosensitive drum 1 at a time in the present embodiment is smaller than that in the configuration according to the first embodiment. This is because the potential difference formed between the charging roller 2 and the photosensitive drum 1 is gradually increased. The toner discharged from the charging roller 2 is collected into the developing container 33. However, if a large amount of toner reaches the developing portion corresponding to the contact portion between the photosensitive drum 1 and the developing roller 31 at a time, the large amount of tonner cannot be collected in some cases. If the tonner cannot be collected at a time, the toner may contaminate the members such as the transfer roller 5 located downstream of the developing container 33 in the rotational direction of the photosensitive drum 1.

In the configuration according to the second embodiment, the following control processing is executed. In the first repetitive operation, a first potential difference formed between the first charging voltage and the surface potential on the photosensitive drum 1 is controlled to gradually increase. In the first repetitive operation, a second potential difference formed between the second charging voltage and the surface potential on the photosensitive drum 1 may be controlled to gradually increase. In the second repetitive operation, a third potential difference between the third charging voltage and the surface potential on the photosensitive drum 1 is controlled to gradually increase. In the second repetitive operation, a fourth potential difference formed between the fourth charging voltage and the surface potential on the photosensitive drum 1 may be controlled to gradually increase.

As described above, the use of the control processing according to the present embodiment makes it possible to improve the developer collection performance compared with the first embodiment, and to prevent contamination of toner not only on the charging roller 2, but also on other members in contact with the photosensitive drum 1.

Next, other embodiments of the present invention will be described. The basic configuration and operation of image-forming apparatuses according to other embodiments are similar to those of the image-forming apparatus according to the first and second embodiments. Accordingly, in the image-forming apparatus according to the present embodiment, elements having functions or configurations identical or corresponding to those of the image-forming apparatus 100 according to the first embodiment are denoted by the same reference numerals as those of the image-forming apparatus 100 in the first and second embodiments, and the detailed descriptions thereof are omitted.

1. Control for Cleaning Operation on Charging Roller Surface

Control Processing According to Present Embodiment

Figure 8:
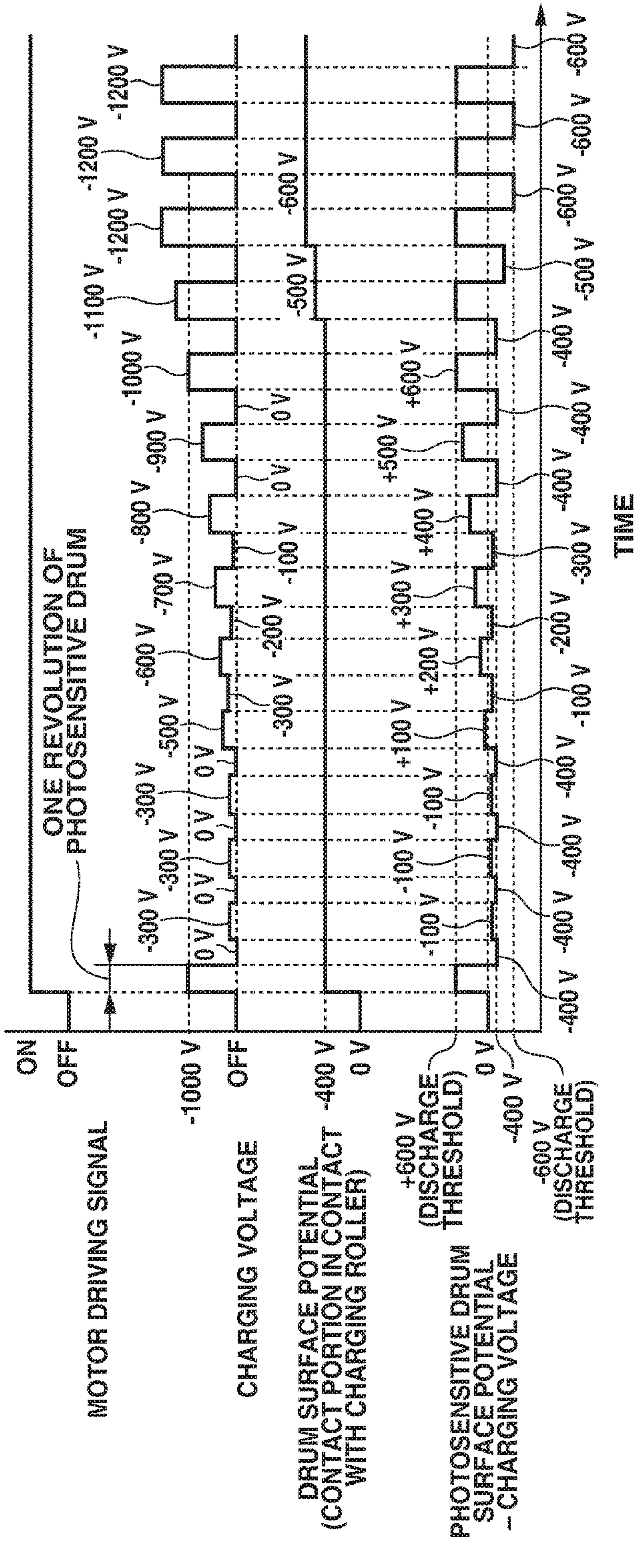
FIG. 8 is a timing diagram illustrating an operation of an image-forming apparatus according to a third embodiment.

Next, processing for controlling the charging voltage according to the present embodiment will be described with reference to FIG. 8. FIG. 8 illustrates a cleaning operation to be performed on the charging roller 2 when the developing container 33 is new in the image-forming apparatus 100 according to the present embodiment. The other operations are similar to those of the first and second embodiments. In the present embodiment, after the surface of the photosensitive drum 1 is charged with −400 V, charging voltages of 0 V and −300 V are alternately applied three times to discharge toner having the positive polarity. After that, like in the second embodiment, the charging voltage is controlled to gradually change with respect to the surface potential on the photosensitive drum 1, and two levels or more of charging voltages are applied in the direction in which the potential difference is gradually increased. The charging voltages are applied in the direction in which the absolute value of the potential difference formed between the charging voltage and the surface potential on the photosensitive drum 1 is gradually increased from 100 V by the amount corresponding to 100 V.

Description of Advantageous Effects

Table 5 illustrates the results of measuring the charge distribution on the surface of the charging roller 2 and the results of calculating the ratio of positively charged toner in the same manner as in the first and second embodiments based on the control processing according to the present embodiment described above.

TABLE 5

| | Charging Voltage during Cleaning on Charging Roller | Tape Density | Image | Ratio of Positive Charge Toner |
|---|---|---|---|---|
| First Embodiment | Charging Voltage ≤ Discharge Threshold, then Charging Voltage ≥ Discharge Threshold (Two Levels of Voltages) | 0.2 | OK | 43% |
| Second Embodiment | Charging Voltage ≤ Discharge Threshold, then Charging Voltage ≥ Discharge Threshold (in Direction in which Potential Difference is Increasing) | 0.4 | OK | 43% |
| Third Embodiment | Charging Bias with Absolute Value Smaller Than Drum Surface Potential is applied, then Control Processing Similar to Second Embodiment is Performed | 0.3 | OK | 40% |

These results show that the same performance as that in the first and second embodiments can be obtained for the image. As for the ratio of positively charged toner, more excellent results than those in the first and second embodiments are obtained. The tape density in the present embodiment tends to deteriorate compared with the first embodiment and tends to be improved compared with the second embodiment.

As described above in the second conventional embodiment with reference to Table 1, it is considered that the ratio of positively charged toner increases after the control processing according to the second conventional embodiment is performed compared to a case where non-application of charging voltage is performed because the ratio of positively charged toner when the surface of the photosensitive drum 1 is first charged increased. Due to the discharge generated between the surface of the charging roller 2 and the surface of the photosensitive drum 1, the positively charged toner on the surface of the charging roller 2 remains on a relatively uppermost surface layer of the charging roller 2. Accordingly, it is effective for the cleaning operation on the charging roller 2 to discharge the toner from the charging roller 2 to the photosensitive drum 1 at an earlier stage. Accordingly, in the present embodiment, the positively charged toner that has increased after the surface of the photosensitive drum 1 is charged is discharged at an early stage in the charging roller cleaning operation, which leads to a reduction in the ratio of positively charged toner compared with the first and second embodiments. In this case, charging voltages of 0 V and −300 V are alternately applied to thereby effectively transfer the toner from the charging roller 2 onto the surface of the photosensitive drum 1. On the other hand, the tape density in the present embodiment tends to be improved as compared with the second embodiment because the amount of discharged toner having the positive polarity is more than that in the second embodiment. Further, compared with the first embodiment, the potential difference formed between the charging roller 2 and the surface potential on the photosensitive drum 1 gradually decreases, like in the second embodiment. Therefore, it can be considered that the tape density tends to slightly deteriorate. Nevertheless, in a third embodiment, the tape density is less than 0.5, which has almost no influence on the image to be actually output.

In the configuration according to the third embodiment, the following control processing is executed. First, no electric charge is discharged between the charging roller 2 and the photosensitive drum 1, and the first charging voltage having a polarity opposite to the normal polarity with respect to the surface potential formed on the surface of the photosensitive drum 1 and the second charging voltage having the opposite polarity and having a magnitude different from that of the first charging voltage are applied to the charging roller 2. After this step, the third charging voltage having the first polarity with respect to the surface potential is applied to the charging roller 2, and the fourth charging voltage having a polarity opposite to the first polarity with respect to the surface potential is applied to the charging roller 2. In this case, control processing is performed such that electric charge is discharged between the charging roller 2 and the photosensitive drum 1 when at least one of the third charging voltage and the fourth charging voltage is applied as the charging voltage.

As described above, the use of the control processing according to the present embodiment makes it possible to reduce the ratio of positively charged toner adhering to the charging roller 2 compared with the second embodiment. Consequently, it is possible to perform the cleaning operation more effectively on the charging roller 2, thereby preventing contamination of toner not only on the charging roller 2, but also on other members in contact with the photosensitive drum 1.

In the present embodiment, as illustrated in FIG. 8, the surface of the photosensitive drum 1 is charged with −400 V, and then charging voltages of 0 V and −300 V are alternately applied three times to discharge the toner having the positive polarity. However, the charging voltages to be applied are not limited to 0 V and −300 V, as long as the charging voltages allow the toner having the positive polarity to be transferred to the photosensitive drum 1 with respect to the surface potential on the photosensitive drum 1. Further, instead of using two levels of charging voltages of 0 V and −300 V, two or more levels of charging voltages may be used. While the advantageous effects of the control processing have been described above with reference to the control processing in combination with the configuration of the second embodiment as the configuration of the third embodiment, the same advantageous effects can also be obtained using only the configuration of the third embodiment, or using the control processing in combination with the configuration of the first embodiment.

While the configurations according to the first to third embodiments employ the cleanerless configuration in which a cleaning member for actively cleaning the surface of the photosensitive drum 1 is not provided, the cleaning member may be provided between the transfer portion and the charging portion in the rotational direction of the photosensitive drum 1. Still alternatively, the brush member 10 may have a function similar to the cleaning member.

As described above, according to an aspect of the present invention, it is possible to prevent generation of a defective image caused by a charging roller.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-045083, filed Mar. 22, 2022, which is hereby incorporated by reference herein in its entirety.

What is claimed is:

1. An image-forming apparatus configured to execute an image-forming operation to form an image on a recording material, the image-forming apparatus comprising:

an image bearing member;

a driving portion configured to rotationally drive the image bearing member;

a charging member to be in contact with a surface of the image bearing member to form a charging portion, the charging member being configured to charge the surface of the image bearing member at the charging portion;

a developing member configured to supply the surface of the image bearing member with developer;

a charging voltage application portion configured to apply a charging voltage to the charging member; and a control unit configured to control the driving portion and the charging voltage application portion, wherein the control unit controls the image-forming operation and a non-image-forming operation different from the image-forming operation to be executable, the non-image-forming operation being an operation to apply the charging voltage to the charging member in a state where the image bearing member is rotated, and wherein, in the non-image-forming operation, the control unit executes the following control processing:

i) not discharging electric charge between the charging member and the image bearing member and applying a first charging voltage having a first polarity with respect to a surface potential on the surface of the image bearing member to the charging member;

ii) after performing the processing of i), not discharging electric charge between the charging member and the image bearing member and applying a second charging voltage to the charging member, the second charging voltage having a polarity opposite to the first polarity with respect to the surface potential; and iii) after performing the processing of ii), controlling a third charging voltage having a second polarity with respect to the surface potential to be applied to the charging member and controlling a fourth charging voltage having a polarity opposite to the second polarity with respect to the surface potential to be applied to the charging member, and controlling electric charge to be discharged between the charging member and the image bearing member in a case where at least one of the third charging voltage and the fourth charging voltage is applied as the charging voltage.

2. The image-forming apparatus according to claim 1, wherein the developing member is configured to be in contact with the image bearing member in the non-image-forming operation.

3. The image-forming apparatus according to claim 1, further comprising a developing container configured to contain the developer, wherein a developer supply container is attachable to the developing container, and wherein the control unit controls the non-image-forming operation to be executed after the developer supply container is attached to the developing container and developer is supplied into the developing container.

4. The image-forming apparatus according to claim 1, further comprising a developing container configured to contain the developer, wherein the developing container is detachably attached to the image-forming apparatus, and wherein the control unit controls the non-image-forming operation to be executed after the developing container is replaced with another developing container.

5. The image-forming apparatus according to claim 1, wherein the control unit controls the first polarity and the second polarity to be set to the same polarity.

6. The image-forming apparatus according to claim 1, wherein the control unit controls the first polarity and the second polarity to be set to opposite polarities.

7. The image-forming apparatus according to claim 1, wherein the control unit controls a first repetitive operation to repetitively execute the processing in i) and the processing in ii) to be executable, and controls, in the first repetitive operation, a first potential difference between the surface potential and the first charging voltage to gradually increase.

8. The image-forming apparatus according to claim 7, wherein the control unit controls, in the first repetitive operation, a second potential difference between the surface potential and the second charging voltage to gradually increase.

9. The image-forming apparatus according to claim 1, wherein the control unit controls a second repetitive operation to repetitively execute the processing in iii) to be executable, and controls, in the second repetitive operation, a third potential difference between the surface potential and the third charging voltage to gradually increase.

10. The image-forming apparatus according to claim 9, wherein the control unit controls, in the second repetitive operation, a fourth potential difference between the surface potential and the fourth charging voltage to gradually increase.

11. An image-forming apparatus configured to execute an image-forming operation to form an image on a recording material, the image-forming apparatus comprising:

an image bearing member;

a driving portion configured to rotationally drive the image bearing member;

a charging member to be in contact with a surface of the image bearing member to form a charging portion, the charging member being configured to charge the surface of the image bearing member at the charging portion;

a developing member configured to supply the surface of the image bearing member with developer charged to a normal polarity;

a charging voltage application portion configured to apply a charging voltage to the charging member; and a control unit configured to control the driving portion and the charging voltage application portion, wherein the control unit controls the image-forming operation and a non-image-forming operation different from the image-forming operation to be executable, the non-image-forming operation being an operation to apply the charging voltage to the charging member in a state where the image bearing member is rotated, and wherein in the non-image-forming operation, the control unit executes the following control processing:

i) not discharging electric charge between the charging member and the image bearing member and applying a first charging voltage and a second charging voltage to the charging member, the first charging voltage having a polarity opposite to the normal polarity with respect to a surface potential on the surface of the image bearing member, the second charging voltage having the opposite polarity and having a magnitude different from the magnitude of the first charging voltage; and ii) after performing the processing of i), controlling a third charging voltage having a first polarity with respect to the surface potential to be applied to the charging member and controlling a fourth charging voltage having a polarity opposite to the first polarity with respect to the surface potential to be applied to the charging member, and controlling electric charge to be discharged between the charging member and the image bearing member in a case where at least one of the third charging voltage and the fourth charging voltage is applied as the charging voltage.

* * * * *